United States Patent [19]

Brandstetter et al.

[11] Patent Number: 4,976,520
[45] Date of Patent: Dec. 11, 1990

[54] COMMON PATH MULTICHANNEL OPTICAL PROCESSOR

[75] Inventors: Robert W. Brandstetter, Levittown; Nils J. Fonneland, Lake Ronkonkoma, both of N.Y.

[73] Assignee: Grumman Aerospace Corporation, Bethpage, N.Y.

[21] Appl. No.: 246,557

[22] Filed: Sep. 9, 1988

[51] Int. Cl.⁵ .............................................. G02F 1/11
[52] U.S. Cl. .................................. 350/384; 350/358; 350/162.12; 364/807; 364/822; 455/611
[58] Field of Search ...................... 350/162.11, 162.12, 350/162.15, 384, 388, 358; 364/802, 807, 822; 455/611

[56] References Cited

U.S. PATENT DOCUMENTS

| | | |
|---|---|---|
| 3,586,416 | 6/1971 | DeBitetto . |
| 3,664,751 | 5/1972 | Haas . |
| 4,017,191 | 4/1977 | Bunge . |
| 4,191,477 | 3/1980 | Schick . |
| 4,225,938 | 9/1980 | Turpin ............................ 350/162.12 |
| 4,236,821 | 12/1980 | Meyer-Arendt . |
| 4,367,009 | 1/1983 | Suzki . |
| 4,370,026 | 1/1983 | Dubroeucq et al. . |
| 4,471,445 | 9/1984 | Pernick ........................... 350/162.12 |
| 4,579,421 | 4/1986 | Brown et al. ................... 350/162.12 |
| 4,647,154 | 3/1987 | Birnbach et al. ............... 350/162.12 |
| 4,699,466 | 10/1987 | Brandstetter et al. .......... 350/162.12 |
| 4,771,397 | 9/1988 | Brandstetter et al. .............. 364/807 |
| 4,771,398 | 9/1988 | Brandstetter et al. .............. 364/807 |

FOREIGN PATENT DOCUMENTS 52-76088  6/1977  Japan ............................... 350/162.12

Primary Examiner—Bruce Y. Arnold
Assistant Examiner—Martin Lerner
Attorney, Agent, or Firm—Pollock, VandeSande & Priddy

[57] ABSTRACT

Adverse environmental effects may be canceled from an optical processor which adjusts the phase of spatially distributed frequency components. This is achieved by projecting the optical modulated signal and a local oscillator optical signal along the same optical path and through the same optical components. Multichannel operation is achieved by positioning the optical components for each stage along a common axis.

8 Claims, 3 Drawing Sheets

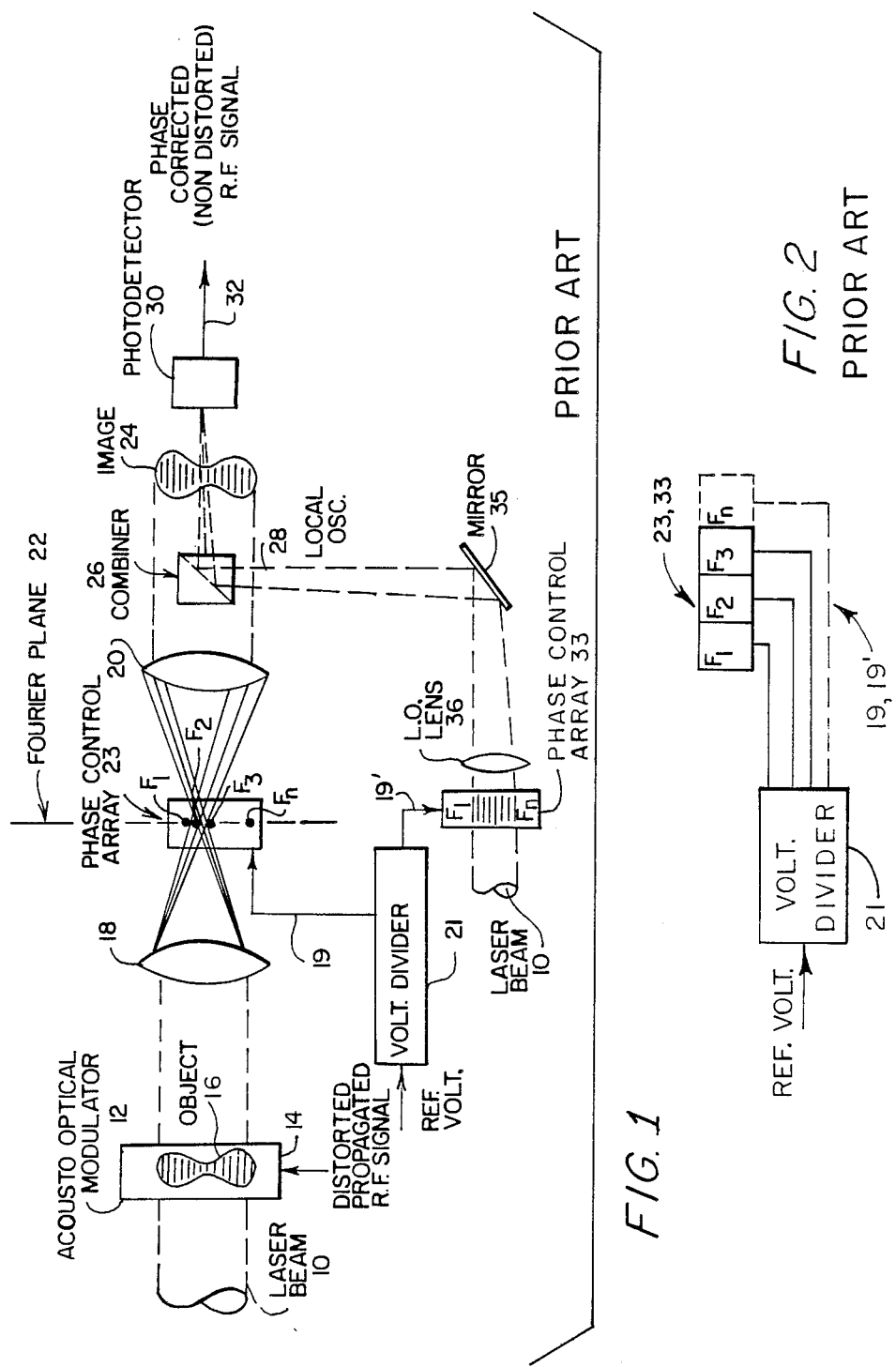

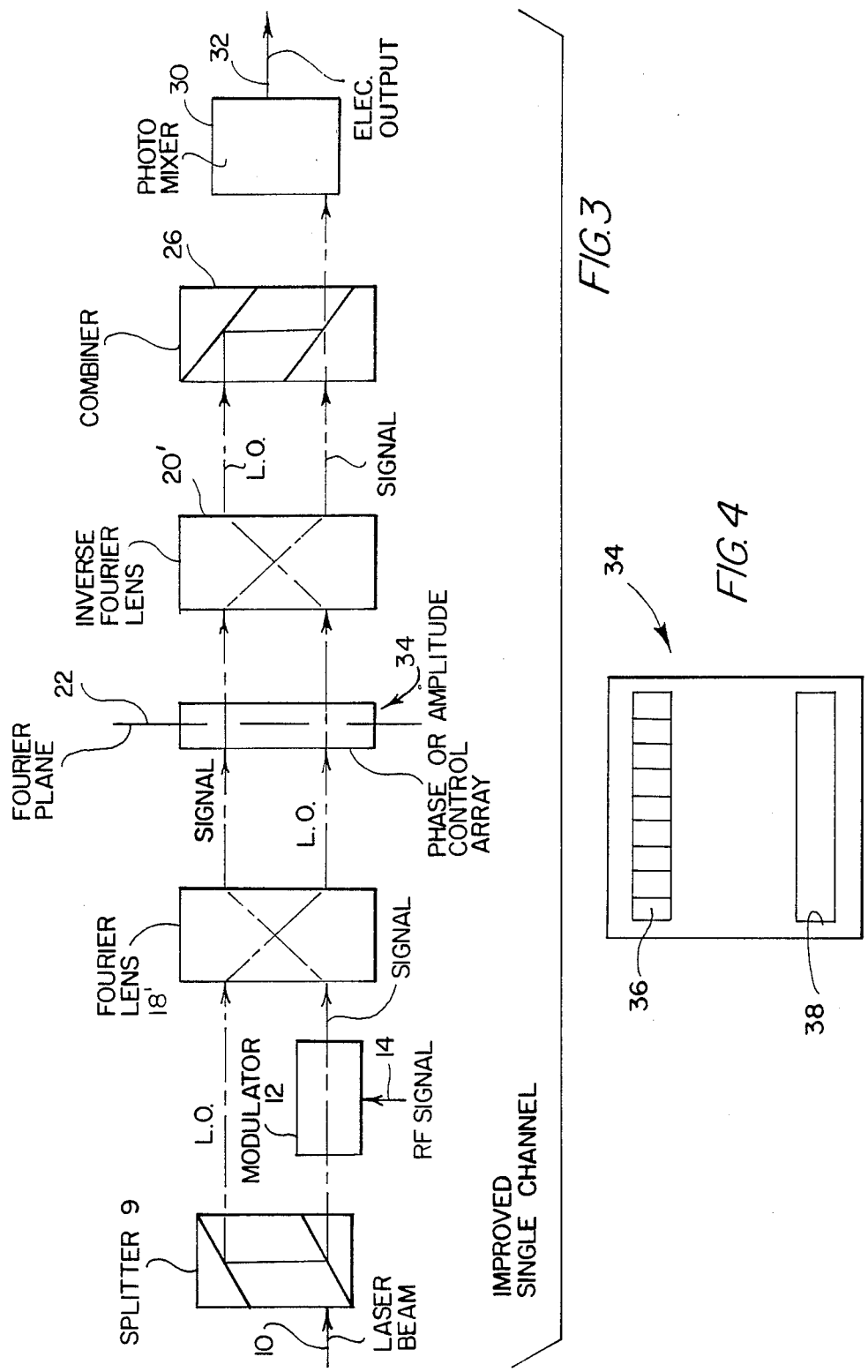

COMMON PATH MULTICHANNEL OPTICAL PROCESSOR

FIELD OF THE INVENTION

The present invention relates to any optical processor which is sensitive to environmental effects.

BACKGROUND OF THE INVENTION

RF signals propagating through a medium generally experience non-linear phase characteristics, namely, non-linear phase variation with frequency. Without special processing, such a propagated signal will be detected as a degraded signal.

Prior art devices have been satisfactorily employed for years to achieve phase and amplitude equalization. However, they are severely restricted in the number of frequencies that can be handled by the digital electronics circuitry and the speed with which the equalization is activated.

U.S. Pat. No. 4,771,398, issued Sept. 13, 1988, and assigned to the present assignee, utilizes coherent optical processing to perform phase equalization corrections of RF signals by providing equalization paths for a multitude of discrete frequencies in a parallel operation. By virtue of the prior invention, thousands of discrete frequencies may be handled.

The aforementioned invention utilizes a phase-controlled array in the Fourier plane to cancel phase distortion of the propagated signal. The array is comprised of individual components that have their birefringence electrically altered to correspondingly alter the phase of the particular frequency associated with the element. The corrected optical signal then undergoes photoelectric transformation at a photomixer and the result is a phase-equalized correction signal which corresponds to an input signal prior to its propagation-induced phase distortion.

Although the apparatus of the co-pending application operates satisfactorily, at times environmental effects cause problems due to the fact that an optically converted RF signal and optical local oscillator signal are introduced to the apparatus along parallel paths. These paths are subject to different environmental effects due to vibration, temperatures, dust, etc. Accordingly, it would be advantageous to introduce the RF and local oscillator signals along a common optical path to negate the different environmental effects.

BRIEF DESCRIPTION OF THE PRESENT INVENTION

The present invention is an improvement of the apparatus in the mentioned U.S. patent. The apparatus provides a means for providing a common optical train for an optically converted RF signal and associated optical local oscillator signal. Therefore, the environmental effects on each are identical and environmental disturbances are self-cancelling. With this common path approach, sharing of common optical components becomes possible thereby affording greater packaging density required in the apparatus.

A further embodiment of the present invention incorporates the common path concept in a plurality of parallel optical channels. Such a multi-channel array allows the use of a different wavelength laser in each channel, should this be desired. Accordingly, this embodiment may be advantageously adapted for frequency multiplexing applications.

BRIEF DESCRIPTION OF THE FIGURES

The above-mentioned objects and advantages of the present invention will be more clearly understood when considered in conjunction with the accompanying drawings, in which:

FIG. 1 is a diagrammatic top plan view of an electro-optic apparatus previously conceived, which introduces an optically converted RF signal and an optical local oscillator signal along two different paths subject to different environmental effects;

FIG. 2 is a partial diagrammatic view of a phase-control array as employed in the apparatus of FIG. 1;

FIG. 3 is a diagrammatic top plan view of the present invention, for a single channel, wherein the optically converted RF and optical local oscillator signals travel through common optical components;

FIG. 4 is a diagrammatic view of a phase or amplitude-control array as employed in the present invention;

DETAILED DESCRIPTION OF THE INVENTION

Figure 5:
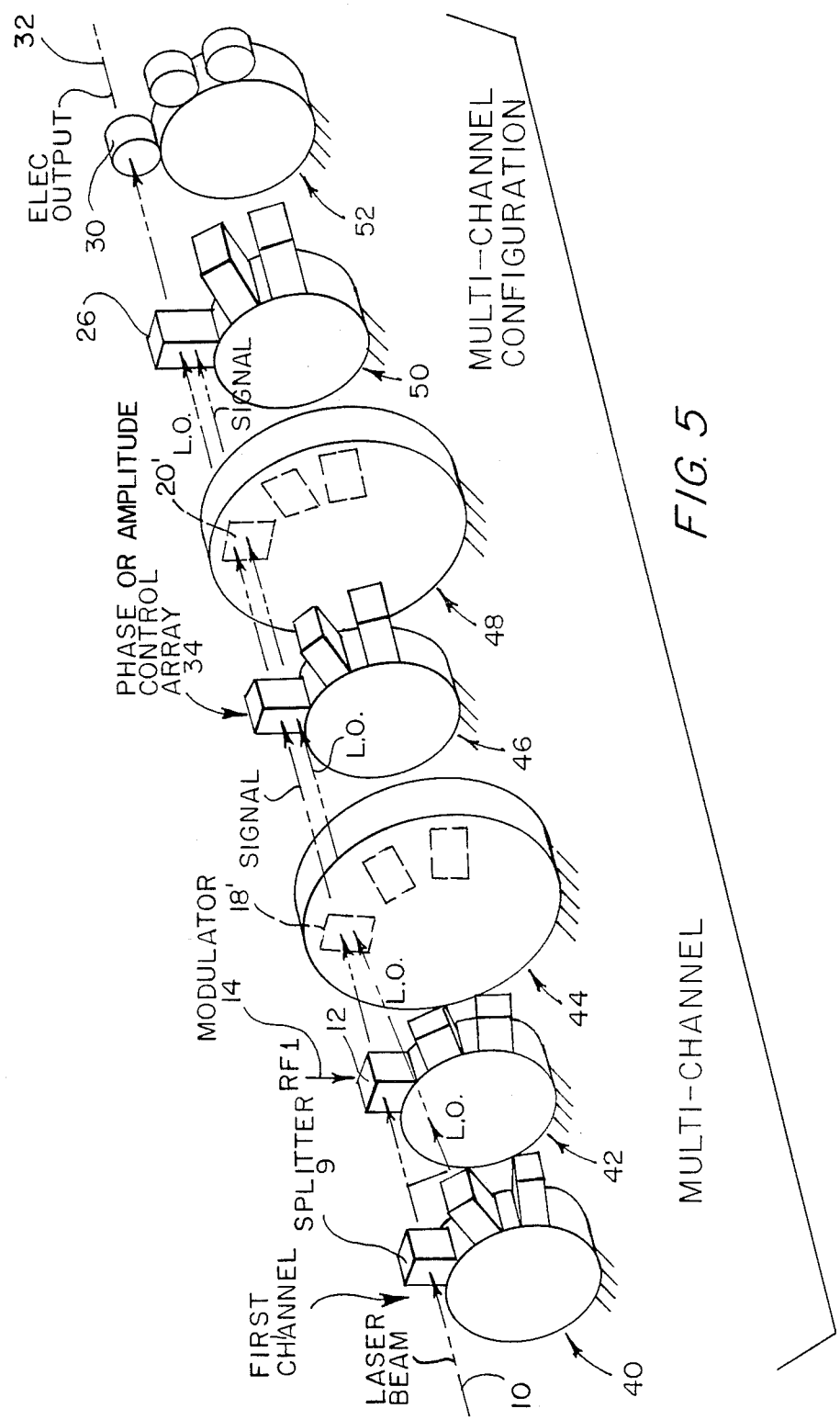
FIG. 5 is a diagrammatic perspective view of a multichannel array, as utilized in a frequency multiplexing embodiment of the invention.

Prior to a detailed description of the present invention, it is instructive to consider the previously conceived optical processor of the mentioned U.S. patent shown in FIG. 1, which is sensitive to environmental effects as previously discussed.

A laser beam 10 serves as an optical carrier signal for a modulating RF signal 14 which has been previously distorted as a result of propagation. The beam 10 and RF signal 14 are introduced to a conventional acousto-optical modulator 12, such as the type manufactured by the ISOMET Corporation; and a modulated acoustic field (object) 16 is formed by modulator 12.

A Fourier plane 22 is developed between Fourier lens 18 and inverse Fourier lens 20. By introducing a phase control array 23 at the Fourier plane 22, a phase equalization capability is realized. Specifically, there is a spatial frequency distribution of object 16 on the Fourier plane 22; and by placing a multi-optical element phase control array 23 in coplanar relationship with the spatial distribution, each frequency component of object 16, as spatially distributed, may undergo phase modification so that a phase-equalized optical signal results. Thus, as will be presently explained, the elements of the array produce desired phase control at each frequency component of the object 16.

To better understand the phase control array 23, reference is made to FIG. 2 wherein a multi-element electro-optic device is illustrated. The individual elements are schematically indicated by corresponding spatially distributed frequency components $F_1$-$F_n$. For purposes of simplicity, only a small number of frequency components is illustrated. However, it should be understood that the apparatus is intended for a large number of frequency components, typically one thousand or more. Appropriate electro-optic devices include PLZT, liquid crystal, Kerr cells, Pockel cells, Faraday cells, and the like. The purpose of each element in the array is to vary the optical path length of the spatially distributed frequency components at the Fourier plane 22 so that the birefringence of each element is varied as required in order to alter the optical path length of each element in a manner that will equalize the phase of each frequency component as it passes through the Fourier plane 22. As a result, the phase of an image located to the right of the inverse Fourier lens 20 is phase equalized relative to the distorted object 16.

The equalized image undergoes processing by combiner 26 which may be a conventional semi-silvered mirror. A laser local oscillator beam 28 forms a second optical input to the combiner 26 to achieve optical heterodyning or down converting thus forming the phase-equalized image 24 which impinges upon an intensity-sensitive square law photodetector 30 for transforming the corrected phase-equalized image 24 to a corrected RF signal at photodetector output 32. As a result, the RF signal at output 32 is a phase-corrected non-distorted signal resembling the original electrical signal which became distorted by propagation prior to introduction to the equalization circuitry of FIG. 1.

It should be pointed out that the phase shift occurring at each of the elements in array 23 can be continuously varied, as in the Kerr, Pockel cell and liquid crystal devices, or discretely varied as in a Faraday cell. The amount of phase shift occurring through each cell is controlled by a device which, in its basic form, may resemble a voltage divider 21 to which a reference voltage is applied. Individual outputs from the voltage divider, as generally indicated by reference numeral 19 (FIG. 2), drive each element of the array to a degree corresponding to the desired phase shift to be achieved by each element of the array 23.

The laser local oscillator beam 28, which forms the second optical input to the combiner 26 is derived from the laser beam 10. The local oscillator beam may be phase-controlled in a manner similar to that disclosed in connection with the signal path through the phase-control array 23. This is done by including a second phase-control array 33 similar in construction to the multi-optical element phase-control array 23. As in the case of the first array 23, the second phase-control array 33 modifies the phase of the laser beam 10 as it impinges upon each element of the array. The lens 36 focuses the phase-modified beam for reflection by mirror 35 to form the local oscillator beam 28. In fact, this beam will be comprised of phase-modified sections which correspond to the phase modifications of the object 16, as a result of phase-control array 23.

The inclusion of a phase-modified local oscillator beam is not mandatory. However, the utilization of both arrays 23 and 33 can be advantageously operated in parallel and/or tandem to achieve phase correction of a distorted propagated RF signal over a wide range of applications.

In accordance with the previously conceived invention, phase correction may be accomplished in three modes:

1. utilization of phase-control array 23 and a local oscillator beam 28 which does not undergo phase control through array 33;
2. phase control of the local oscillator beam 28 by utilization of array 33 and no utilization of a phase-control array 23 at the Fourier plane 22; and
3. utilization of phase-control arrays 23 and 33.

The degree of elemental local oscillator phase control is determined by the voltage divider output 19' in the same manner previously described in connection with voltage divider output 19, which drives the phase-control array 23.

Although the apparatus illustrates a single pass device, if additional phase correction is required, multiple passes through the phase control arrays 23 and 33 may be accomplished by a recursive technique which may typically utilize mirrors (not shown) for achieving multiple passes.

The modification of the optical path length through each array element, corresponding to phase shift through that element, may be expressed by the equation:

$$\Delta\phi = 2\pi(\Delta t \, n_c C)/\lambda$$

where
$\Delta t$ is the differential delay;
$n_c$ is equal to the refractive index of the element cell;
$C$ is equal to the speed of light; and
$\lambda$ is the wavelength of the laser beam 10.

Although the apparatus has been described for radio frequencies, it is equally applicable to phase equalizing frequency components of other multi-frequency signals, regardless of the medium through which they propagate and encounter distortion.

In situations where amplitude equalization of signal frequency components is also necessary, this may be achieved by modifying the frequency components of the signal at the Fourier plane; additional amplitude equalization being possible by modifying the local oscillator beam. The means for so modifying the amplitude of individual frequency components is by utilizing arrays of light filtering elements, as disclosed in our co-pending patent application entitled METHOD AND APPARATUS FOR OPTICAL RF AMPLITUDE EQUALIZATION, Ser. No. 857,288, now U.S. patent Ser. No. 4,771,397, issued Sept. 13, 1988.

The Improvement

The present invention eliminates the separate path for local oscillator beam 28, as employed in the previously conceived apparatus. It has been found that, by introducing the local oscillator along a separate optical path, different environmental effects are experienced along each of the optical paths, which results in a deteriorated RF signal at the output 32. Therefore, the common path approach can be used to improve any optical heterodyne processor where phase and amplitude stability are important.

The local oscillator beam and signal beam are directed along a common optical path, between shared components, as will be seen from FIG. 3. Identical components in FIGS. 1 and 3 have been similarly numbered. The embodiment of FIG. 3 illustrates a single channel of signal communication.

Laser beam 10 is subjected to a beam splitter 9 for generating an upper beam serving as a local oscillator (L.O.) beam and a lower carrier signal to the input of acousto-optical modulator 12. The RF signal 14 is introduced into the modulator as was the case in FIG. 1 and an optically modulated signal is generated at the output of modulator 12. Fourier lens 18' performs the same function as lens 18 in FIG. 1 but handles both the local oscillator beam and the optical signal beam. The Fourier lens 18' may, for example, be a Casegrainian type. Spatially distributed frequency components of an object undergo phase or amplitude modification at array 34. However, the array includes two separate windows 36 and 38, as shown in FIG. 4; the windows respectively passing the signal beam and local oscillator beam. Although phase correction may be accomplished in the three modes previously mentioned, FIG. 4 shows the construction of a phase and amplitude control array in the configuration corresponding to the first mode, namely phase or amplitude control of the signal beam but not the local oscillator beam. This would be accomplished by including an electro-optic device in window 36, of the typical type previously mentioned in connection with phase or amplitude control array 23 of FIG. 1 while passing the local oscillator beam through a clear window 38. The local oscillator beam and signal beam individually pass through inverse Fourier lens 20' and are combined at combiner 26. As will be appreciated, the more significant aspect of the present improvement is the utilization of a common optical path wherein the path lengths of both the local oscillator beam and signal beam are the same; and the use of common optical components ensures that the previously discussed effects from the environment are the same upon each beam. Therefore, any adverse environmental effects thereof are canceled. The combined beam is converted to an electrical signal at output 32 of a photodetector 30.

FIG. 5 illustrates a multi-channel apparatus for allowing the use of different wavelength lasers for each signal channel, should this be desired, such as for frequency multiplexing applications. Only three separate channels have been indicated in FIG. 5, but it is to be understood that many more may be incorporated in the illustrated apparatus. Identical components in FIG. 3 and FIG. 5 are indicated by the same reference numerals.

Considering a first channel of the multi-channel apparatus, a laser beam 10 is directed to beam splitter 9 which, like a number of similar splitters, is coaxially mounted around a fixed ring 40. The laser beam then undergoes modulation at 12, while the split laser beam, serving as a local oscillator beam, is passed through a central clear portion of a ring 42, which coaxially mounts a number of acousto-optical modulators 12. The first channel path then continues with Fourier lens 18' which is coaxially mounted with other Fourier lenses on a disc 44.

The channel then continues through phase and amplitude control array 34 which is mounted to fixed ring 46, coaxially with other similar arrays. Inverse Fourier lens 20' is coaxially mounted with other lenses on disc 48. Optical processing continues with combiner 26, the latter being coaxially mounted with similar combiners on fixed ring 50. The combined beam is then directed to photodetecter 30 which generates an electrical signal output for the first channel along output lead 32. The other illustrated axially distributed optical components are respectively coaxially aligned so that a plurality of channels is generated in the same direction as the first channel. The resultant multi-channel array allows the use of different wavelength lasers for each signal channel when desired, such as in the application of frequency multiplexing. The various optical beams, namely the signal and local oscillator beams from the different channels can occupy the same compact volume without interaction. This sharing of a common optical direction affords greater packaging density. As a result, the present invention produces an optical processor with superior operational results while requiring less space than would be otherwise required.

It should be understood that the invention is not limited to the exact details of construction shown and described herein, for obvious modifications will occur to persons skilled in the art.

We claim:

1. An optical processor having:
    means for splitting light from a single laser source into a local oscillator (L.O.) beam and a signal beam parallel therewith;
    means for modulating the parallel signal beam with an RF signal;
    optical Fourier means positioned in optical alignment with the modulating means and located along the signal beam for spatially distributing the signal beam, the L.O. beam passing through the same Fourier means;
    phase control means connected to the Fourier means for optically equalizing the phase of spatially distributed components of the signal beam;
    means located downbeam of the Fourier means for combining the L.O. beam and signal beam maintained in close parallel relation through the processor thereby generating an optical signal corresponding to the signal beam after having undergone optical equalizing;
    converting means responsive to the optical signal for generating a corresponding electrical output signal;
    whereby parallel paths of the L.O. beam and signal beam cancel environmental effects that would otherwise adversely affect the phase equalization of the signal beam.

2. The structure set forth in claim 1 wherein the optical Fourier means comprises a Fourier lens through which the L.O. beam and signal beam both pass for transforming the signal beam to a spatially distributed image at a Fourier plane; and
    means located downbeam of the Fourier plane through which the L.O. beam and signal beam both pass for inversely transforming the signal beam to a non-distributed image.

3. The structure set forth in claim 1 or claim 2 wherein the modulating means is an acousto-optic modulator.

4. The structure set forth in claim 1 wherein a multi-channel optical processor is formed with the capability of communicating beams of respectively different frequency, each channel comprising:
    means mounted on a common mount, for splitting light from the laser source;
    optical Fourier means mounted on a common mount for passing the L.O. beam along the same parallel path as the signal beam; and
    phase-control means mounted on a common mount;
    the multi-channel processor permitting multiple frequency operation with different lasers in a compact volume.

5. The process as set forth in claim 1 together with second phase control means co-planar and adjacent the first phase control means for varying the phase of the local oscillator beam.

6. In a method for optically processing an input signal having the steps of modulating a laser beam with the input signal to form a signal beam which is communicated to means for equalizing phase components of the input signal, an improved method for phase equalizing the input signal comprising the steps:
    splitting a laser beam into dual beams including a local oscillator (L.O.) beam and a signal beam to be optically modulated by the input signal;

spatially distributing the signal beam and directing the L.O. beam in close parallel relation along the same path therewith;

optically equalizing the phase of the signal beam components along the mutually close parallel optical path of the L.O. beam; and combining the L.O. beam and the close parallel signal beam for generating an optical signal corresponding to the phase-equalized signal beam;

converting the optical signal to a corresponding electrical output signal;

whereby communication of the L.O. and signal beams along the same path cancels environmental effects that would otherwise adversely affect phase equalization of the signal beam.

7. The method set forth in claim 6, wherein the step of spatially distributing the signal beam occurs at a Fourier plane, as a function of frequency, thereby enabling phase equalization of the input signal frequency components.

8. The method set forth in claim 6 together with the step of varying the phase of L.O. beam in the same plane as phase equalization occurs.

* * * * *